(12) United States Patent (10) Patent No.: US 8,914,841 B2
Harrison (45) Date of Patent: Dec. 16, 2014

(54) METHOD AND SYSTEM FOR MAPPING BETWEEN CONNECTIVITY REQUESTS AND A SECURITY RULE SET

(75) Inventor: Reuven Harrison, Tel Aviv (IL)

(73) Assignee: Tufin Software Technologies Ltd., Ramat Gan (IL)

( * ) Notice: Subject to any disclaimer, the term of this patent is extended or adjusted under 35 U.S.C. 154(b) by 0 days.

(21) Appl. No.: 13/303,425

(22) Filed: Nov. 23, 2011

(65) Prior Publication Data

US 2012/0192246 A1 Jul. 26, 2012

Related U.S. Application Data

(60) Provisional application No. 61/417,025, filed on Nov. 24, 2010.

(51) Int. Cl.
*G06F 21/00* (2013.01)
*H04L 29/06* (2006.01)
*G06F 21/57* (2013.01)

(52) U.S. Cl.
CPC .......... *G06F 21/577* (2013.01); *H04L 63/0263* (2013.01)
USPC ........ 726/1; 726/26; 726/11; 726/14; 726/13; 726/23; 713/153; 713/154; 713/168; 709/223; 709/224; 709/238; 380/229; 706/45; 706/47; 379/145; 379/189

(58) Field of Classification Search
CPC . H04L 63/0263; H04L 63/20; H04L 63/0227; G06F 21/577; G06F 21/00
USPC ........ 726/1, 11, 13, 14, 47; 713/166; 379/111
See application file for complete search history.

(56) References Cited

U.S. PATENT DOCUMENTS 5,627,886 A * 5/1997 Bowman ........................ 379/111
6,098,172 A 8/2000 Coss et al.
(Continued)

FOREIGN PATENT DOCUMENTS

EP 2 023 567 A1 * 2/2009 .............. H04L 29/06

OTHER PUBLICATIONS

Gianluca Maiolini & Andrea Baiocchi, Adaptive Optimization of Packet Filtering Devices Performance Ensuring a Conflict-free Network Configuration, in INFOCOM Workshops IEEE (2008).*

(Continued)

*Primary Examiner* — Morshed Mehedi
*Assistant Examiner* — Sharon Lynch
(74) *Attorney, Agent, or Firm* — Browdy and Neimark, PLLC

(57) ABSTRACT

A system capable of automated mapping between a connectivity request and an ordered security rule-set and a method of operating thereof. The system includes an interface operable to obtain data characterizing at least one connectivity request; a module for automated recognizing at least one rule within the rule-set, the rule controlling traffic requested in the at least one connectivity request, wherein the recognizing is provided by comparing a set of combinations specified in the connectivity request with a set of combinations specified in the rule and matching connectivity-related actions specified in the connectivity request; a module for automated evaluating relationship between traffic controlled by the recognized at least one rule and traffic requested in the at least one connectivity request; and a module for automated classifying, in accordance with evaluation results, the at least one connectivity request with respect to the at least one rules and/or vice versa.

16 Claims, 6 Drawing Sheets

(56) References Cited

U.S. PATENT DOCUMENTS

| | | | |
|---|---|---|---|
| 6,484,261 B1 | 11/2002 | Wiegel | |
| 6,826,698 B1 | 11/2004 | Minkin et al. | |
| 7,032,022 B1 | 4/2006 | Shanumgam et al. | |
| 7,143,439 B2* | 11/2006 | Cooper et al. | 726/11 |
| 8,037,517 B2* | 10/2011 | Fulp et al. | 726/11 |
| 8,042,167 B2* | 10/2011 | Fulp et al. | 726/11 |
| 8,056,116 B2* | 11/2011 | Katoh et al. | 726/2 |
| 8,176,561 B1* | 5/2012 | Hurst et al. | 726/25 |
| 2003/0177389 A1* | 9/2003 | Albert et al. | 713/201 |
| 2003/0212657 A1 | 11/2003 | Kaluskar et al. | |
| 2004/0177139 A1* | 9/2004 | Schuba et al. | 709/223 |
| 2004/0250127 A1* | 12/2004 | Scoredos et al. | 713/201 |
| 2005/0010765 A1* | 1/2005 | Swander et al. | 713/166 |
| 2005/0144289 A1* | 6/2005 | Yoshiuchi et al. | 709/227 |
| 2005/0193429 A1* | 9/2005 | Demopoulos et al. | 726/23 |
| 2005/0262569 A1* | 11/2005 | Shay | 726/26 |
| 2006/0075467 A1* | 4/2006 | Sanda et al. | 726/1 |
| 2006/0153191 A1* | 7/2006 | Rajsic et al. | 370/392 |
| 2006/0195896 A1* | 8/2006 | Fulp et al. | 726/11 |
| 2006/0248580 A1* | 11/2006 | Fulp et al. | 726/11 |
| 2006/0294577 A1* | 12/2006 | Gouda et al. | 726/1 |
| 2007/0016945 A1* | 1/2007 | Bassett et al. | 726/11 |
| 2007/0094707 A1 | 4/2007 | Karch | |
| 2008/0172347 A1* | 7/2008 | Bernoth et al. | 706/12 |
| 2008/0172731 A1* | 7/2008 | Aaron | 726/13 |
| 2008/0215518 A1 | 9/2008 | Matsuda | |
| 2008/0256593 A1* | 10/2008 | Vinberg et al. | 726/1 |
| 2008/0282313 A1 | 11/2008 | Diaz-Cuellar et al. | |
| 2008/0282336 A1 | 11/2008 | Diaz Cuellar et al. | |
| 2008/0282339 A1* | 11/2008 | Nakae et al. | 726/13 |
| 2008/0289027 A1* | 11/2008 | Yariv et al. | 726/11 |
| 2009/0138938 A1* | 5/2009 | Harrison et al. | 726/1 |
| 2010/0011433 A1 | 1/2010 | Harrison et al. | |
| 2010/0100949 A1* | 4/2010 | Sonwane et al. | 726/7 |
| 2010/0235879 A1* | 9/2010 | Burnside et al. | 726/1 |
| 2010/0257598 A1* | 10/2010 | Demopoulos et al. | 726/13 |
| 2010/0299741 A1 | 11/2010 | Harrison et al. | |
| 2011/0060713 A1* | 3/2011 | Harrison et al. | 706/47 |
| 2011/0093913 A1* | 4/2011 | Wohlert et al. | 726/1 |
| 2011/0107418 A1* | 5/2011 | Bhagwan et al. | 726/22 |
| 2011/0173692 A1* | 7/2011 | Liu et al. | 726/13 |

OTHER PUBLICATIONS

Ehab Al-Shaer et al., Conflict Classification and Analysis of Distributed Firewall Policies, in v. 23, 10 IEEE Journal on Selected Areas in Communications 2069-2083 (2005).*

Ehab Al-Shaer et al., Firewall Policy Advisor for Anomaly Discovery and Rule Editing, in International Symposium on Integrated Network Management 17-30 (2003).*

Subrata Acharya et al., Traffic-Aware Firewall Optimization Strategies, in International Conference on Communications 2225-2230 (2006).*

Subrata Acharaya et al., Optwall: A Hierarchical Traffic-Aware Firewall, in Proceedings of the Network and Distributed System Security Symposium (2007).*

* cited by examiner

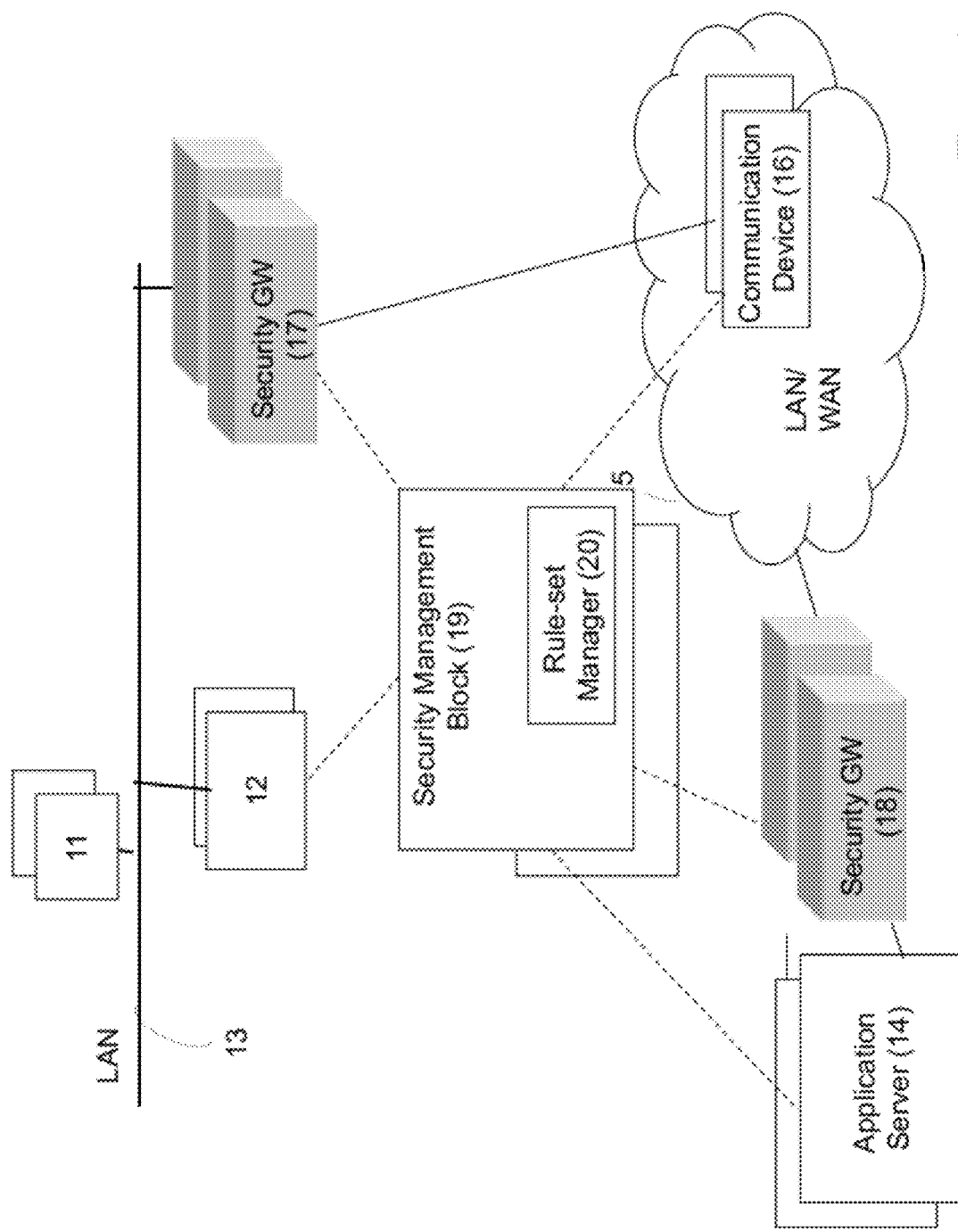

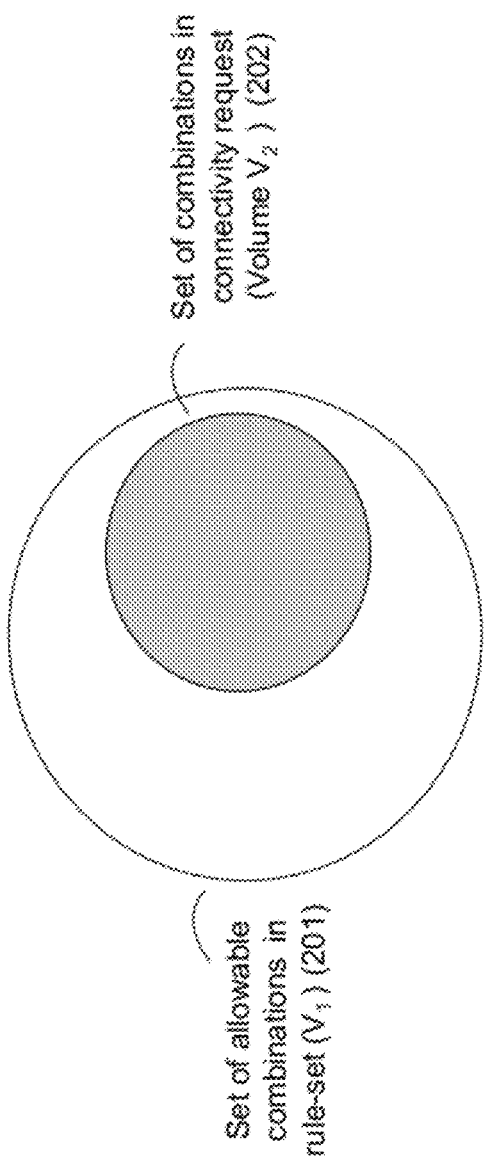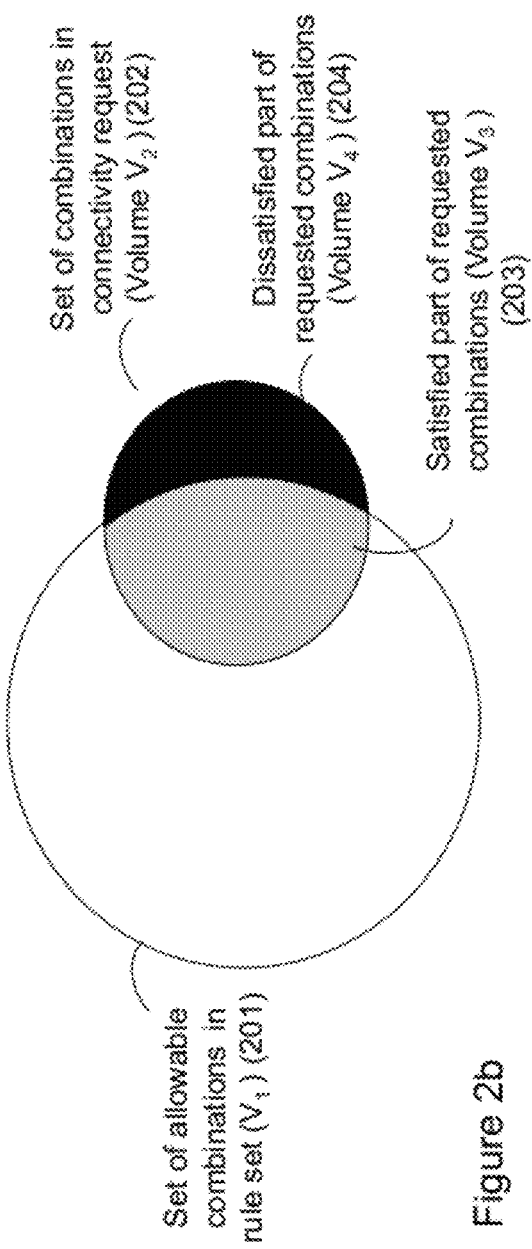
Figure 2a
Figure 2b

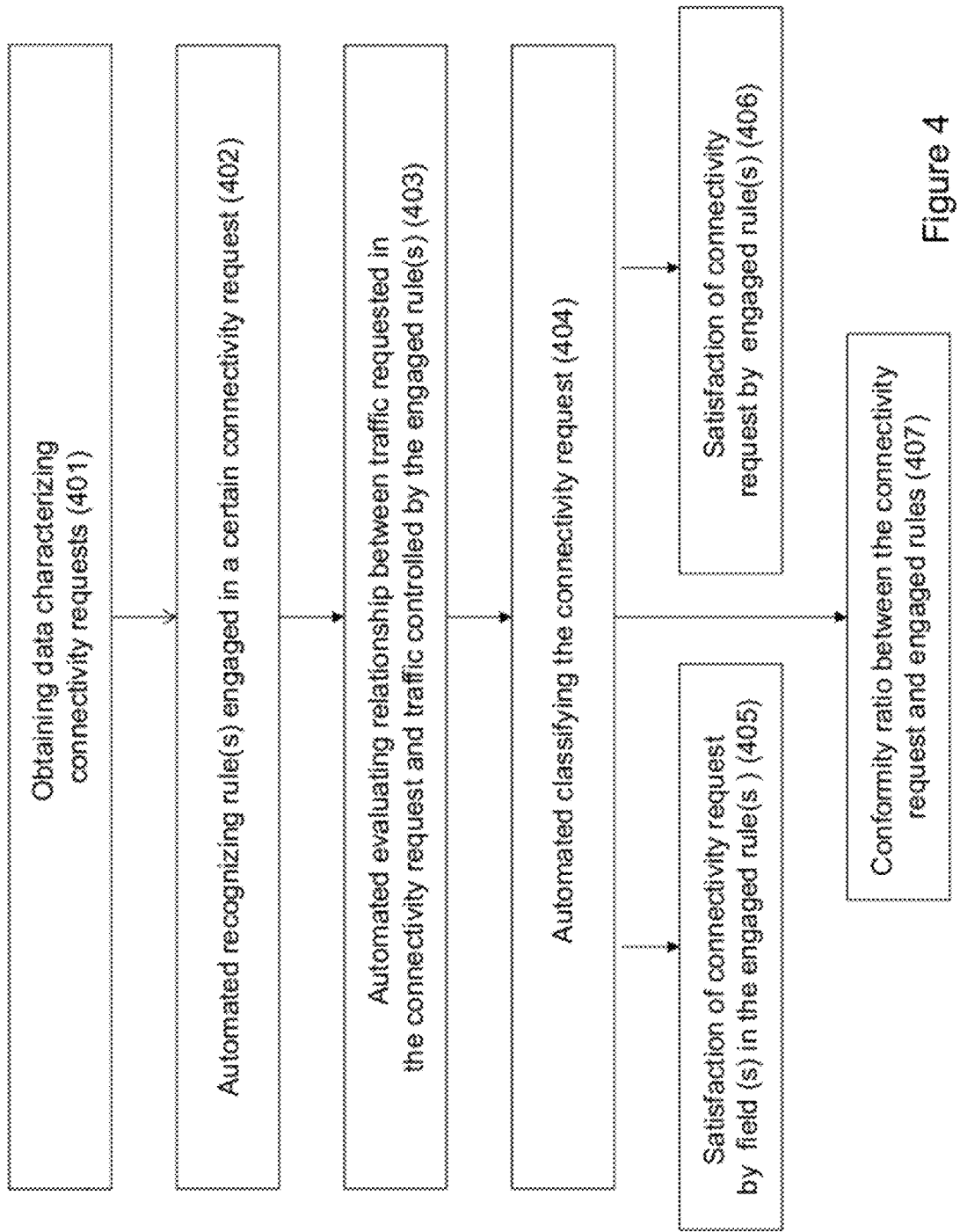

METHOD AND SYSTEM FOR MAPPING BETWEEN CONNECTIVITY REQUESTS AND A SECURITY RULE SET

CROSS-REFERENCES TO RELATED APPLICATIONS

This application relates to and claims priority from U.S. Provisional Patent Application No. 61/417,025 filed on Nov. 24, 2010 incorporated herein by reference in its entirety.

FIELD OF THE INVENTION

This invention generally relates to network security, and more particularly, to methods and systems capable of managing a security rule-set.

BACKGROUND OF THE INVENTION

Today, information security is one of the critical concerns in computer networks and services. Various methods have been developed for protection of various resources and services; usually these methods include implementation of one or more security policies, combinations and hierarchies thereof. Typically, a security policy implemented in a respective rule-set includes control of inbound and outbound traffic related to certain resources. Such control is enforced with the help of one or more security gateways, which can comprise various devices and/or combinations thereof (e.g. switches, routers, firewalls, VPN devices, load balancers, etc.).

However, maintaining the security rule-set presents an increasing challenge to security departments worldwide. The problems of security rule-set management, including amending a rule-set and/or verifying thereof, have been recognized in the Prior Art and various systems have been developed to provide a solution as, for example:

U.S. Pat. No. 6,098,172 (Coss et al.) discloses a firewall supporting multiple security policies and/or multiple users by applying any one of several distinct sets of access rules. The firewall can also be configured to utilize "stateful" packet filtering which involves caching rule processing results for one or more packets, and then utilizing the cached results to bypass rule processing for subsequent similar packets. Dynamic rules may be used in addition to pre-loaded access rules in order to simplify rule processing.

U.S. Pat. No. 6,826,698 (Minkin et al.) discloses a system, method and computer program product for affording network security features. The method includes: identifying a plurality of network objects; retrieving rule-sets associated with at least one of the identified network objects, the rule-sets including a plurality of policy rules that govern actions relating to the identified network objects; reconciling overlapping policy rules of the rule-sets amongst the network objects; and executing the reconciled rule-sets.

US Patent Application No. 2003/212657 (Lu et al.) discloses an extensible rules engine that uses database technology that provides a rules evaluation service for applications external to the database server or database management system. Applications are able to utilize the rules engine to provide alternative behaviors based on information against which specified conditions are evaluated. A framework is provided for specifying data definitions that can be referenced by user-defined rules, through creation and use of an evaluation context. Application-specific data types can be defined by specifying data tables and/or variables that can be referenced by rules created for evaluation against data that is associated with the evaluation context.

US Patent Application 2007/094707 (Karch) discloses a rules-based system enforcing security policies in a data access management system. The rules based system provides rules that preclude certain activities, but those rules are only implemented and fired upon certain conditions occurring. This results in certain actions being precluded when specified conditions are true, without additional software required to check for the condition each time the action is requested.

US Patent Application No. 2008/215518 (Matsuda) discloses a filtering rule analysis system for analyzing the rules of a packet filtering process that is set in network devices. The system includes: a rule storage for storing sets of rules for which an order of priority has been established; a matrix generator for generating matrix spatial data that contains information of the order of priority and that indicates the correspondence relation between a minimum region identified by starting points and end points of ranges of packet attributes described in each rule as the condition of application of that rule and those rules; and an overlap analyzer for referring to the matrix spatial data to analyze overlap between the rules.

US Patent Application No. 2008/282313 (Diez-Cuellar et al.) discloses a computer-readable medium having a data structure stored thereon for defining a schema for expressing a network security policy. The data structure includes a first data field including data defining a parameter to be applied based on the network security policy. The network security policy defines at least one of the following: a firewall rule and a connection security rule. The data structure also includes a second data field having data specifying restrictions of the parameter included in the first data field. The parameter in the first data field and the restrictions in the second data field form the schema for expressing the network security policy to be processed. The network security policy manages communications between a computing device and at least one other computing device.

US Patent Application No. 2010/011433 (Harrison et al.) discloses a rule-set generator and a method of automated configuration of a security gateway. The method comprises setting-up an initial rule-set; obtaining log records of communication events corresponding to the initial rule-set so as to obtain a sufficient amount of log records; transforming the obtained log records into respective rules, wherein source, destination and service fields in each rule correspond to source, destination and service values in respective obtained log record, and the action in all rules is defined as "Accept", thus giving rise to a transformation-based rule-set; and processing the transformation-based rule-set so as to generate an operable rule-set.

SUMMARY OF THE INVENTION

Security policy serves the function of allowing business connectivity with minimized vulnerability. The respective rule-set, implemented on one or more security gateways, usually requires constant amendments corresponding to changes in business needs. Typically, the rule-set is amended in response to connectivity requests. A connectivity request associates business resources (client, application, project, etc.) with requested connectivity between network resources (source and destination). The requested connectivity can be characterized by accepting, denying, authenticating, encrypting or taking other actions related to the traffic between the specified network resources. Optionally, the connectivity request can specify also duration of the required connectivity.

In accordance with certain aspects of the presently disclosed subject matter, there is provided technique for mapping between a connectivity request and security rule(s) engaged in controlling the traffic corresponding to the connectivity request and/or mapping between a certain rule and connectivity request(s) related to the traffic controlled by the rule.

By way of non-limiting example, such mapping can be useful for analyzing, especially before amending/deleting a rule, which business resources depend on the rule; finding and removing relevant rules for expired connectivity requests; tracking administrator who implemented certain tickets issued responsive to connectivity requests; providing a business justification for certain rules in the rule base, etc.

In accordance with other aspects of the presently disclosed subject matter, there is provided a system capable of automated mapping between a connectivity request and an ordered security rule-set. The system comprises an interface operable to obtain data characterizing at least one connectivity request; means for automated recognizing at least one rule within the rule-set, said rule controlling traffic requested in said at least one connectivity request, wherein the recognizing is provided by comparing a set of combinations specified in the connectivity request with a set of combinations firstly specified in the rule and matching connectivity-related actions (e.g. accepting, denying, authenticating and encrypting actions, etc.) specified in said at least one connectivity request; means for automated evaluating relationship between traffic controlled by said recognized at least one rule and traffic requested in said at least one connectivity request; and means for automated classifying, in accordance with evaluation results, said at least one connectivity request with respect to said at least one rules and/or said at least one rule with respect to said at least one connectivity request.

The relationship between traffic controlled by a certain rule and traffic requested in a certain connectivity request can be evaluated in accordance with conformity between the rule and respective connectivity request, said conformity being indicative of involvement of said certain rule in business needs associated with said certain connectivity request. Alternatively or additionally, the means for evaluating relationship between traffic controlled by said at least one rule and traffic requested in said at least one connectivity request can be operable to calculate a ratio between an un-shadowed volume requested in said at least one rule and the overall un-shadowed volume of said at least one rule, thus giving rise to a conformity ratio characterizing the relationship between said at least one connectivity request and said certain rule.

In accordance with other aspects of the presently disclosed subject matter, there is provided a method of automated managing an ordered security rule-set. The method comprises: obtaining data characterizing one or more of connectivity requests; automated recognizing at least one connectivity request requesting traffic at least partially controlled by a certain rule from the rule-set, thus giving rise to at least one connectivity request engaged with respect to said certain rule, wherein the recognizing is provided by comparing a set of combinations specified in connectivity requests with a set of combinations firstly specified in the certain rule and matching connectivity-related actions specified in respective connectivity requests; automated evaluating relationship between the traffic controlled by said certain rule and the traffic requested in said at least one engaged connectivity request; and, in accordance with the evaluation result, automated classifying said certain rule with respect to said at least one engaged connectivity request.

The relationship between the traffic controlled by said certain rule and the traffic requested in said at least one engaged connectivity request can be evaluated in accordance with conformity between said certain rule and said engaged connectivity request, said conformity being indicative of satisfaction of said engaged connectivity request by said certain rule. Alternatively or additionally, evaluating the relationship between the traffic controlled by said certain rule and the traffic requested in said at least one engaged connectivity request can comprise calculating a ratio between an un-shadowed volume requested in said certain rule and the overall un-shadowed volume of said certain rule, thus giving rise to a conformity ratio being indicative of a degree of satisfaction of said engaged connectivity request by said certain rule. The conformity ratio can be calculated separately for the fields of said certain rule.

In accordance with further aspects, the method can further comprise evaluating relationship between traffic controlled by the entire rule-set and traffic requested in all respectively engaged connectivity requests. Evaluating can comprise calculating a ratio between an un-shadowed volume requested in the entire rule-set and the overall un-shadowed volume of the rule-set, thus giving rise to a conformity ratio indicative of a degree of justification of the rule-set by business needs. The method can further comprise classifying the entire rule-set, wherein the entire rule-set can be classified as requiring amendment if the calculated conformity ratio does not match a predefined criterion related to compliance of the rule-set.

In accordance with other aspects of the presently disclosed subject matter, there is provided a method of automated managing an ordered security rule-set, the method comprises: obtaining data characterizing at least a certain connectivity request; automated recognizing at least one rule from the rule-set, said rule at least partially controlling traffic requested in said certain connectivity request, thus giving rise to at least one rule engaged with respect to said certain connectivity request, wherein the recognizing is provided by comparing a set of combinations specified in said certain connectivity request with a set of combinations firstly specified in respective rules and matching connectivity-related actions specified in said certain connectivity request; automated evaluating relationship between the traffic requested in said certain connectivity request and traffic controlled by said at least one engaged rule and the traffic; and, in accordance with the evaluation result, automated classifying said certain connectivity request with respect to said at least one engaged rule.

The relationship between the traffic requested in said certain connectivity request and the traffic controlled by said at least one engaged rule can be evaluated in accordance with implementation criterion, said implementation criterion being indicative of satisfying said certain connectivity request by said at least one engaged rule. Alternatively or additionally, evaluating the relationship between the traffic requested in said certain connectivity request and traffic controlled by said at least one engaged rule can comprise calculating a ratio between an un-shadowed volume requested in said at least one engaged rule and the overall un-shadowed volume of said rule, thus giving rise to a conformity ratio characterizing a degree of satisfaction of said certain connectivity request by said at least one engaged rule. The conformity ratio can be calculated separately for the fields of said certain rule.

The method can further comprise evaluating relationship between traffic requested in all connectivity requests and traffic controlled by all respectively engaged rules in the rule-set, wherein evaluating comprises calculating a ratio between an un-shadowed volume requested in all engaged rules and the overall un-shadowed volume of all engaged rules.

The method can further comprise automated recognizing at least two rules belonging to different rule-sets and engaged with respect to said certain connectivity request, wherein different rule-sets correspond to different revisions of a security policy; automated evaluating relationship between the traffic requested in said certain connectivity request and traffic controlled by engaged rules corresponding to said different rule-sets; in accordance with the evaluation result, automated classifying said different rule-sets and/or respective revisions of the security policy. Such classification can identify the first policy revision fully satisfying respective connectivity requests, identifying the first policy revision that denied, partially of fully, the respective connectivity requests; a policy revision that modified the extent of the implementation; a policy revision that modified the set of engaged rules, etc.

BRIEF DESCRIPTION OF THE DRAWINGS

In order to understand the invention and to see how it can be carried out in practice, an embodiment will now be described, by way of non-limiting example only, with reference to the accompanying drawings, in which:

FIG. 1 illustrates a generalized network environment applicable to certain embodiments of the presently disclosed subject matter;

FIGS. 2a and 2b schematically illustrate the relationship between traffic allowed in a rule-set and traffic required in a connectivity request;

FIG. 4 illustrates a generalized flow-chart of mapping of a certain connectivity request to one or more rules in accordance with certain embodiments of the presently disclosed subject matter;

DETAILED DESCRIPTION OF EXEMPLARY EMBODIMENTS

Figure 3:
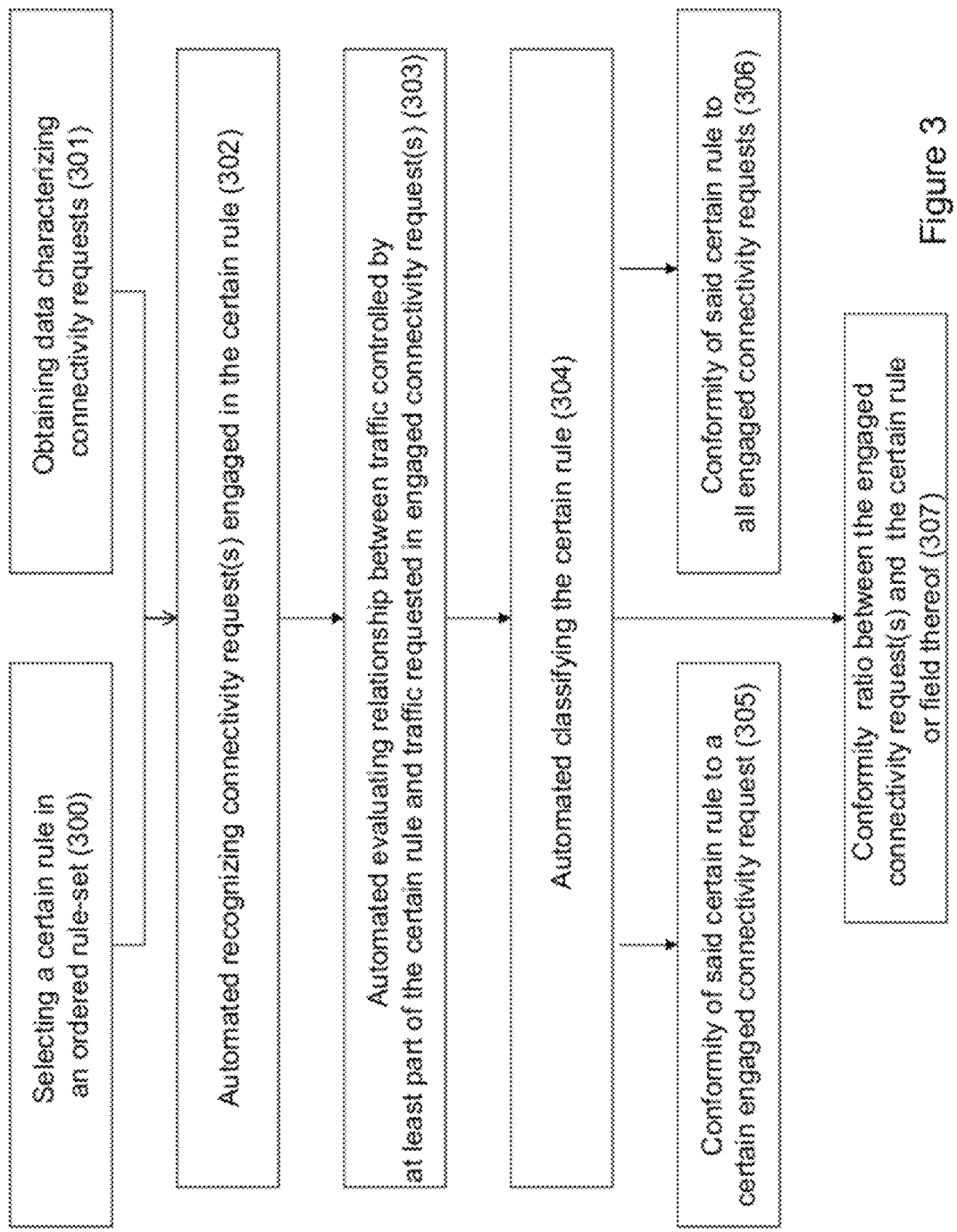
FIG. 3 illustrates a generalized flow-chart of mapping a certain rule to one or more connectivity requests in accordance with certain embodiments of the presently disclosed subject matter.

In the following detailed description, numerous specific details are set forth in order to provide a thorough understanding of the invention. However, it will be understood by those skilled in the art that the presently disclosed subject matter can be practiced without these specific details. In other instances, well-known methods, procedures, components and circuits have not been described in detail so as not to obscure the presently disclosed subject matter. In the drawings and descriptions, identical reference numerals indicate those components that are common to different embodiments or configurations.

Unless specifically stated otherwise, as apparent from the following discussions, it is appreciated that throughout the specification discussions utilizing terms such as "processing", "modifying", "calculating", "determining", "generating", "configuring", "searching", "finding", or the like, refer to the action and/or processes of a computer that manipulate and/or transform data into other data, said data represented as physical, such as electronic, quantities and/or said data representing the physical objects. The term "computer" should be expansively construed to cover any kind of electronic system with data processing capabilities.

The operations in accordance with the teachings herein can be performed by a computer specially constructed for the desired purposes or by a general-purpose computer specially configured for the desired purpose by a computer program stored in a non-transitory computer readable storage medium.

Embodiments of the presently disclosed subject matter are not described with reference to any particular programming language. It will be appreciated that a variety of programming languages can be used to implement the teachings of the inventions as described herein.

The term "criterion" used in this patent specification should be expansively construed to include any compound criterion, including, for example, several criteria and/or their logical combinations.

The references cited in the background teach many principles of security management that are applicable to the present invention. Therefore the full contents of these publications are incorporated by reference herein where appropriate for appropriate teachings of additional or alternative details, features and/or technical background.

Bearing the above in mind, attention is drawn to FIG. 1 schematically illustrating an exemplary network environment applicable to certain embodiments of the presently disclosed subject matter.

The network environment comprises a plurality of network resources, e.g. workstations 11 and/or servers 12, application servers 14 (and/or others not shown remote network resources as, for example, remote hosts, etc.). The network resources can be operatively connected via one or more local (13) and/or wide area (15) communication networks (including Internet). A communication network comprises one or more communication devices 16 (e.g. switches, routers, bridges, etc.) facilitating the data transfer. The network environment further comprises one or more security gateways. In the illustrated non-limiting example security gateway 17 is operatively connected to the private network 13 and to the wide area network 15 and controls inbound and outbound traffic related to the private network and resources thereof; security gateway 18 is operatively connected to the application servers 14 and to the wide area network 15 and controls the respective traffic. The security gateways can comprise, for example, one or more routers or firewalls with respective load balancers, intrusion detection/prevention systems, VPN devices and/or other equipment facilitating network and/or application security.

The security gateways operate in accordance with one or more rules controlling, at least, inbound and/or outbound traffic with regard to respective resources. These rules (including combinations and/or hierarchies thereof) are referred to hereinafter as a rule-set or rule base. A single rule typically includes several fields (e.g. source (IP address and/or port), destination (IP address and/or port), service type, user, application, etc.), and an action which shall be drawn from the rule when a certain condition with regard to the field values is satisfied. The fields included in such condition(s) are referred to hereinafter as "fields engaged in the rules". A field can be characterized by a specified set of values (e.g. a certain IP address, a certain range of TCP ports, a certain range of IP addresses in a LAN defined by a mask, any port, etc.). The action in the rule can specify accepting or denying the respective traffic, authentication, encryption, etc.

The security gateways are operatively connected to a security management block 19. The security management block can be, fully or partly, integrated with one or more security gateways and/or with other network resources, or can be implemented in one or more stand-alone servers. The functions of a security management block can include providing a backend for the policy editor GUI, monitoring the operation of the security gateways, storing the rule-set database and log database, reporting, etc.

In accordance with certain embodiments of the currently presented subject matter, the security management block comprises a rule-set manager 20. As will be further detailed with reference to FIGS. 2-6, the rule-set manager 20 is operable to provide mapping between a connectivity request and security rules engaged in controlling the traffic corresponding to the request, and/or mapping between a certain rule and connectivity request(s) related to the traffic controlled by the rule.

Note that the disclosed subject matter is not bound by the specific architecture described with reference to FIG. 1, and is, likewise, applicable to any network architecture facilitating protection of data network resources in accordance with a rule-set installed at any suitable security gateway(s) capable of controlling the respective traffic.

For purpose of illustration only, the following description is made with respect to connectivity requests requesting allowance of certain traffic. Those skilled in the art will readily appreciate that the teachings of the presently disclosed subject matter are applicable in a similar manner to connectivity requests alternatively or additionally requesting dropping of certain traffic and/or requesting other actions specified in the connectivity requests.

Referring to FIGS. 2a and 2b, there is schematically illustrated the relationship between traffic allowed in a rule-set and traffic required in a connectivity request. Some connectivity requests can conflict with the current rule-set, and require rule-set amendments in order to be accepted.

A circle 201 represents a set of allowable values of a given rule-set with prioritized order of rules (referred to hereinafter as an ordered rule-set). The values specified in the fields are referred to as "allowable" if they are connected by an allowance condition and not shadowed by previous rules (e.g. previous rules should not specify the same combinations of values). The represented set 201 is characterized by allowable combinations and a number thereof. The number of allowable combinations is characterized by un-shadowed allowable volume $V_1$ which is calculated over the rule-set. The term "un-shadowed allowable volume of a rule" should be expansively construed to cover any metric of the rule indicative of a number of allowable combinations of atomic values (e.g. a single IP in Source or Destination, a single port in the Service field, a single user in the User field, etc.) in the engaged fields of the rule, such combinations firstly specified in the rule. The term "un-shadowed allowable volume of a rule-set", accordingly, characterizes the aggregated un-shadowed allowable volumes of the rules in the rule-set. By way of non-limiting examples, the un-shadowed volume of the rule-set can be calculated as a derivative of an un-shadowed volume of each rule (e.g. sum of the number of allowable combinations in each rule, logarithm of this sum, the maximum of logarithms of the number of combination in each rule, etc.). Calculation of derivatives shall consider the rule shadowing resulting from the "first-match-win" nature of the ordered rule-set.

By way of non-limiting example, un-shadowed allowable volume of the ordered rule-set can be calculated as follows:
a) Identify for each permissive rule un-shadowed combinations available in a rule and which do not exist in the previous rules, e.g. unique combinations of the form "Src IP×Dst IP×Service" that will be first matched to the given rule;
b) Calculate a number of such un-shadowed conditions in each permissive rule;
c) Define rule-set allowable un-shadowed volume by summarizing the number of un-shadowed combinations for each individual permissive rule.

A circle 202 represents a set of values specified in a given connectivity request. The represented set is characterized by requested allowable combinations and the number thereof (volume $V_2$). By way of non-limiting example, the number of requested combinations (volume $V_2$) can be calculated as a multiplication of a number of IP addresses in a source field with a number of allowable IP addresses in a destination field and a number of services in a service field of the connectivity request.

FIG. 2a illustrates a case where the entire connectivity request is satisfied by the initial rule-set. FIG. 2b illustrates an unfitting connectivity request where the gray part 203 (characterized by volume $V_3$) represents an intersection of sets 201 and 202, i.e. a part of connectivity request satisfied in the rule-set; and the black part 204 (characterized by volume $V_4$) represents a complement of the set 202 relative to set 201, i.e. a part of the connectivity request dissatisfied in the initial rule-set. Volumes $V_3$ and $V_4$ can be calculated similar to Volume $V_2$ for satisfied and dissatisfied combinations, accordingly.

Referring to FIG. 3, there is illustrated a generalized flowchart of mapping a certain rule to one or more connectivity requests in accordance with certain embodiments of the presently disclosed subject matter. Upon selecting a certain rule (300) and obtaining data characterizing one or more connectivity requests (301), the rule-set manager recognizes, among these connectivity requests, one or more connectivity requests engaged with respect to this certain rule, i.e. requesting traffic at least partially controlled by the certain rule (302). The rule-set manager further evaluates (303) relationship between the traffic controlled by a certain rule and the traffic requested in engaged connectivity requests, and classifies (304) the certain rule accordingly.

A non-limiting example of an exemplified ordered rule-set is presented in Table 1 and a non-limiting example of exemplified connectivity requests is presented in Table 2.

Table 3 illustrates mapping between the rules from Table 1 and the connectivity requests presented in Table 2 and requesting traffic at least partly controlled by respective rules. Mapping is provided by comparing, in a manner detailed with reference to FIG. 2, a set of allowable combinations firstly specified in the rule with a set of allowable combinations specified in the connectivity requests.

As illustrated:
AR1 is the connectivity request engaged in Rule 1;
AR2, AR3 and AR7 are connectivity requests engaged in Rule 2;
AR4, AR5, AR6 are connectivity requests engaged in Rule 3.

TABLE 1

| Rule base | | | | |
|---|---|---|---|---|
| # | Source | Destination | Service | Action |
| 1 | 10.0.0.2 | 192.168.1.14 | SQL | Allow |
| 2 | 10.0.1.0/24 | 192.168.2.0/24 | Any | Allow |
| 3 | 192.168.0.0/16 | Any | Telnet SSH | Allow |

TABLE 2

Connectivity Requests

| ID | Source | Destination | Service | Action |
|---|---|---|---|---|
| AR1 | 10.0.0.2 | 192.168.1.14 | SQL | Allow |
| AR2 | 10.0.1.1 | 192.168.2.17 | HTTP | Allow |
| AR3 | 10.0.1.1 | 192.168.2.17 | HTTPS | Allow |
| AR4 | 192.168.0.0/16 | Any | Telnet | Allow |
| AR5 | 192.168.0.0/16 | Any | SSH | Allow |
| AR6 | 192.168.0.0/16 | Any | Any | Allow |
| AR7 | 10.0.1.1 | 192.168.2.17 | HTTP HTTPS | Allow |

TABLE 3

Rules mapped to connectivity requests

| # | Source | Destination | Service | Action | Requests |
|---|---|---|---|---|---|
| 1 | 10.0.0.2 | 192.168.1.14 | SQL | Allow | AR1 |
| 2 | 10.0.1.0/24 | 192.168.2.0/24 | Any | Allow | AR2 AR3 AR7 |
| 3 | 192.168.0.0/16 | Any | Telnet SSH | Allow | AR4 AR5 AR6 |

The relationship between the rules and respective engaged connectivity requests can be described as follows:

Rule 1 exactly corresponds to the engaged request AR1, the traffic controlled by the rule is identical to the traffic requested in the connectivity request AR1;

Rule 2 provides more access than requested in the combination of the engaged requests AR2, AR3 and AR7;

Rule 3 exactly corresponds to the combination of engaged requests AR4 and AR5, but provides more access than requested in each one of the engaged requests. Rule 3 allows less traffic than was requested in the connectivity request AR6.

The relationship between the traffic controlled by a certain rule and the traffic requested in one or more engaged connectivity requests can be evaluated in accordance with conformity between the rule and respective requests. Conformity of the rule is indicative of involvement of the rule in business needs associated with respective connectivity requests. Table 4 illustrates conformity of rules in Table 1 with respect to each of engaged requests and in respect to all recognized engaged requests.

TABLE 4

Rules mapped to connectivity requests and relationship thereof.

| # | Source | Destination | Service | Action | Conformity rule vs. request | Conformity rule vs. all engaged requests |
|---|---|---|---|---|---|---|
| 1 | 10.0.0.2 | 192.168.1.14 | SQL | Allow | AR1 - Exact | Exact |
| 2 | 10.0.1.0/24 | 192.168.2.0/24 | Any | Allow | AR2 - Extra AR3 - Extra AR7 - Extra | Extra permissiveness |
| 3 | 192.168.0.0/16 | Any | Telnet SSH | Allow | AR4 - Extra AR5 - Extra AR6 - Underneath | Underneath permissiveness |

Conformity between a certain rule and one or more engaged connectivity requests can be further characterized by a ratio between a requested un-shadowed volume of the rule and the overall un-shadowed volume of the rule; such a ratio is referred to hereinafter as a "conformity ratio". Optionally, the conformity ratio can be calculated as a ratio between a requested volume of the rule and the overall volume of the rule. The respective volumes for conformity ratio can be calculated in a manner similar to calculations of volumes detailed with reference to FIG. 2. Table 5 illustrates the conformity ratio of rules in Table 1 with respect to each of the engaged requests.

TABLE 5

Rules mapped to connectivity requests and conformity ratio thereof

| # | Source | Destination | Service | Action | Requests | Conformity Ratio (CR) |
|---|---|---|---|---|---|---|
| 1 | 10.0.0.2 | 192.168.1.14 | SQL | Allow | AR1 | 100% |
| 2 | 10.0.1.0/24 | 192.168.2.0/24 | Any | Allow | AR2 | Low |
|  |  |  |  |  | AR3 | Low |
|  |  |  |  |  | AR7 | Low |
| 3 | 192.168.0.0/16 | Any | Telnet SSH | Allow | AR4 | 50% |
|  |  |  |  |  | AR5 | 50% |
|  |  |  |  |  | AR6 | >100% |

As illustrated in Table 5, ratios that are too low to be meaningful can be signified as "Low" without indicating respective values. CR>100% signifies that un-shadowed volume in the engaged rule is less than the requested connectivity.

Complex rules and/or connectivity requests can be further broken down into their composites and the mapping can be provided per composite. By way of non-limiting example, Table 6 illustrates a relationship between composites of rule 3 and connectivity requests AR4 and AR5.

TABLE 6

Composites of Rule 3 mapped to connectivity requests AR4 and AR5 and the relationship thereof

| # | Source | Destination | Service | Action | Conformity |
|---|---|---|---|---|---|
| 3.1 | 192.168.0.0/16 | Any | Telnet | Allow | Exact |
| 3.2 | 192.168.0.0/16 | Any | SSH | Allow | Exact |

The conformity ratio can be calculated separately for the fields of the rule (source, destination, service, etc.) as illustrated in Table 7.

TABLE 7

Rules mapped to connectivity requests with CR per field

| # | Request | CR/Source | CR/Destination | CR/service |
|---|---|---|---|---|
| 1 | AR1 | 100% | 100% | 100% |
| 2 | AR2 | 0.39% | 0.39% | Low |
|   | AR3 | 0.39% | 0.39% | Low |
|   | AR7 | 0.39% | 0.39% | Low |
| 3 | AR4 | 100% | 100% | 50% |
|   | AR5 | 100% | 100% | 50% |
|   | AR6 | 100% | 100% | >100% |

Thus, upon evaluation of relationship (303), a certain rule can be classified (304) by its relevance (conformity) with respect to one or more engaged connectivity requests (305) and/or with respect to all recognized engaged connectivity requests (306), and/or by conformity ratio between the rule and/or the field(s) thereof and one or more (or all) engaged connectivity requests (307), etc.

Likewise, the classification can be provided for a certain set of rules or for the entire rule-set. Conformity ratio of the entire rule-set is indicative of degree of justification of the rule-set by business needs. The conformity ratio of the entire rule-set with respect to all recognized connectivity requests can be characterized by a ratio between requested un-shadowed volume of the rule-set (calculated with respect to all recognized engaged rules) and the overall un-shadowed volume of the rule-set. By way of non-limiting example, in a rule-set characterized by 70% conformity ratio, 70% of un-shadowed allowable volume is justified by connectivity requests.

A certain rule or a certain set of the rules can be further classified as requiring amendment if respective conformity ratio does not match a predefined criterion related to compliance of the rule-set (e.g. minimal conformity ratio of a rule-set, minimal conformity ratio of a set of certain rule (and/or fields thereof) with respect to certain engaged connectivity requests, etc.).

Referring to FIG. 4, there is illustrated a generalized flowchart of mapping a certain connectivity request to one or more rules in accordance with certain embodiments of the presently disclosed subject matter. Upon obtaining data characterizing one or more connectivity requests (401), the rule-set manager recognizes (402) one or more rules engaged with respect to these connectivity requests, i.e. rule(s) at least partly controlling the requested traffic. The rule-set manager further evaluates (403) relationship between the traffic requested in the connectivity requests and the traffic controlled by the engaged rule(s) and classifies (404) the certain connectivity request(s) accordingly.

Table 8 illustrates mapping between connectivity requests presented in Table 2 and the rules from Table 1 at least partly controlling the requested traffic. Mapping is provided by comparing, in a manner detailed with reference to FIG. 2, a set of allowable combinations specified in the connectivity requests with a set of allowable combinations firstly specified in the rule.

TABLE 8

Connectivity requests mapped to rules

| ID | Source | Destination | Service | Action | Rules |
|---|---|---|---|---|---|
| AR1 | 10.0.0.2 | 192.168.1.14 | SQL | Allow | 1 |
| AR2 | 10.0.1.1 | 192.168.2.17 | HTTP | Allow | 2 |
| AR3 | 10.0.1.1 | 192.168.2.17 | HTTPS | Allow | 2 |
| AR4 | 192.168.0.0/16 | Any | Telnet | Allow | 3 |
| AR5 | 192.168.0.0/16 | Any | SSH | Allow | 3 |
| AR6 | 192.168.0.0/16 | Any | Any | Allow | 3 |
| AR7 | 10.0.1.1 | 192.168.2.17 | HTTP HTTPS | Allow | 2 |

Similar to the relationship between the rules and engaged connectivity requests illustrated with reference to FIG. 3, the relationship between the connectivity requests and the engaged rules can be characterized by conformity and the conformity ratio. Alternatively or additionally, the relationship between the connectivity requests and the engaged rules can be characterized by an implementation criterion characterizing whether the engaged rule(s) (or fields thereof) satisfy the connectivity request in a fully or partial manner. Table 9 illustrates an implementation criterion and conformity ratio of connectivity requests in Table 2 with respect to each of the engaged rules. Rule 3 partly satisfied the connectivity request AR6 and its un-shadowed volume is less than the requested connectivity (CR>100%).

TABLE 9

Connectivity requests mapped to the rules and relationship thereof

| ID | Source | Destination | Service | Action | Rule # | Implementation | CR |
|---|---|---|---|---|---|---|---|
| AR1 | 10.0.0.2 | 192.168.1.14 | SQL | Allow | 1 | Full | 100% |
| AR2 | 10.0.1.1 | 192.168.2.17 | HTTP | Allow | 2 | Full | Low |
| AR3 | 10.0.1.1 | 192.168.2.17 | HTTPS | Allow | 2 | Full | Low |
| AR4 | 192.168.0.0/16 | Any | Telnet | Allow | 3 | Full | 50% |
| AR5 | 192.168.0.0/16 | Any | SSH | Allow | 3 | Full | 50% |
| AR6 | 192.168.0.0/16 | Any | Any | Allow | 3 | Partial | >100% |

TABLE 9-continued

Connectivity requests mapped to the rules and relationship thereof

| ID | Source | Destination | Service | Action | Rule # | Implementation | CR |
|---|---|---|---|---|---|---|---|
| AR7 | 10.0.1.1 | 192.168.2.17 | HTTP HTTPS | Allow | 2 | Full | Low |

In accordance with certain embodiments of the presently disclosed subject matter, a certain connectivity request can be classified by its satisfaction (implementation criterion) with respect to one or more fields in an engaged rule (405) and/or with respect to one or more rules (406), by conformity ratio between engaged connectivity request and one or more engaged rules and/or the field(s) thereof (407), conformity, conformity ratio and/or implementation criterion fitting a predefined criterion, etc.

In order to adjust to changing business requirements, security policies are often modified by adding, deleting, editing or reordering rules or indirectly by editing objects that are used by the rules. A snapshot of the evolving policy at a given time is referred to hereinafter as a policy revision.

One or more certain connectivity requests can be mapped to the rule-sets corresponding to different policy revisions and/or values associated thereof (e.g. administrator created the revision, revision number, revision time, etc.) in a manner similar to that detailed with reference to FIGS. 3 and 4. Such mapping enables characterizing a difference between policy revisions by differences in conformity, conformity ratio and/or implementation criterion related to respective rule-sets and connectivity requests. Mapping one or more certain connectivity requests to the rule-sets corresponding to different policy revisions can also enable identifying the first policy revision fully satisfying respective connectivity requests. Likewise, such mapping can also enable identifying the first policy revision that denied, partially of fully, the respective connectivity requests; a policy revision that modified the extent of the implementation; a policy revision that modified the set of engaged rules, etc. Table 10 illustrates non-limiting example of mapping between policy revisions and access requests.

TABLE 10

Mapping between policy revisions and access requests

| Policy Revision | Administrator | Newly Implemented Requests | Decommissioned Requests |
|---|---|---|---|
| 1 | Michael | AR2, AR7 | AR1 |
| 2 | Reuven | AR4 | AR2 |
| 3 | Gil-Ad | AR3 | — |

Likewise, different required rule-set amendments (e.g. adding a host to a network group, removing a host from a source field of a rule, reordering rules etc) can be mapped to one or more certain connectivity requests thus enabling associating the required amendments with business needs.

In accordance with certain embodiments of the presently disclosed subject matter, elements of other types of access-related configurations (e.g. routing tables, NAT configurations, VPN configurations, user access configurations, load balancing configurations, etc.) can be mapped with respect to connectivity requests (and vice versa) in a manner similar to that detailed with reference to FIGS. 3 and 4.

Sometimes enabling a connectivity request can require changes in multiple access-related configurations. By way of non-limiting example, opening access from one server to another can include enabling access through a firewall and also enabling respective routing on a router. By way of another non-limiting example, allowing a user group to access the CRM server can require changing a firewall configuration and the configuration on a web proxy. The connectivity request can be mapped with respect to each of these access-related configurations.

In accordance with certain embodiments of the currently presented subject matter, mapping between the connectivity requests and the engaged rules can be further provided with respect to the network topology.

Figure 5A:
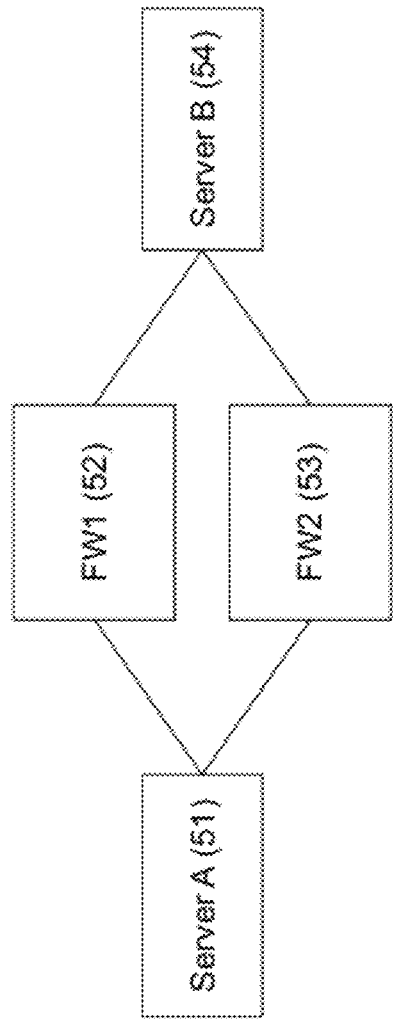
FIGS. 5a and 5b illustrate a generalized network topology enabling exemplified connectivity requests.

In the unlimited example illustrated in FIG. 5a, server A (51) can reach server B (54) through two paths each traversing different firewalls (52 or 53). Accordingly, classification of this connectivity request can include indication of firewall(s) implementing the engaged rules. If both firewalls implement the engaged rules, fully or partially, the classification with respect to these rules can be "implemented with redundancy".

Figure 5B:
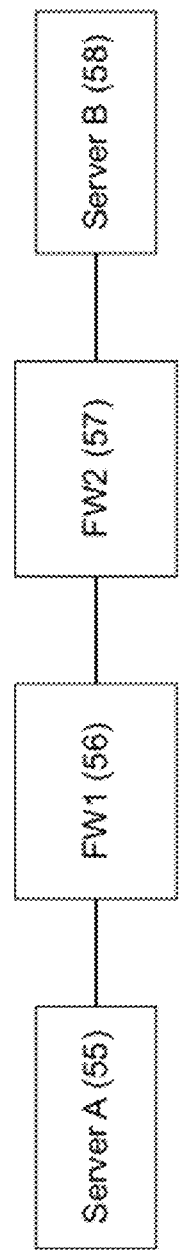

In another unlimited example illustrated in FIG. 5b, server A (55) can reach server B (58) through two serially deployed firewalls 56 and 57. Likewise, classification of a connectivity request in such topology can include indication of firewall(s) implementing each of the engaged rules.

The rule-set manager can be further configured to obtain a model of the network topology, determine the security gateways involved in one or more certain connectivity requests and provide mapping of these connectivity requests with respect to the network path(s) meeting the conditions in the connectivity requests.

Similar to mapping between connectivity request and policy revisions, revisions of the topology map can also be mapped to connectivity access requests that are impacted by the changes.

Figure 6:
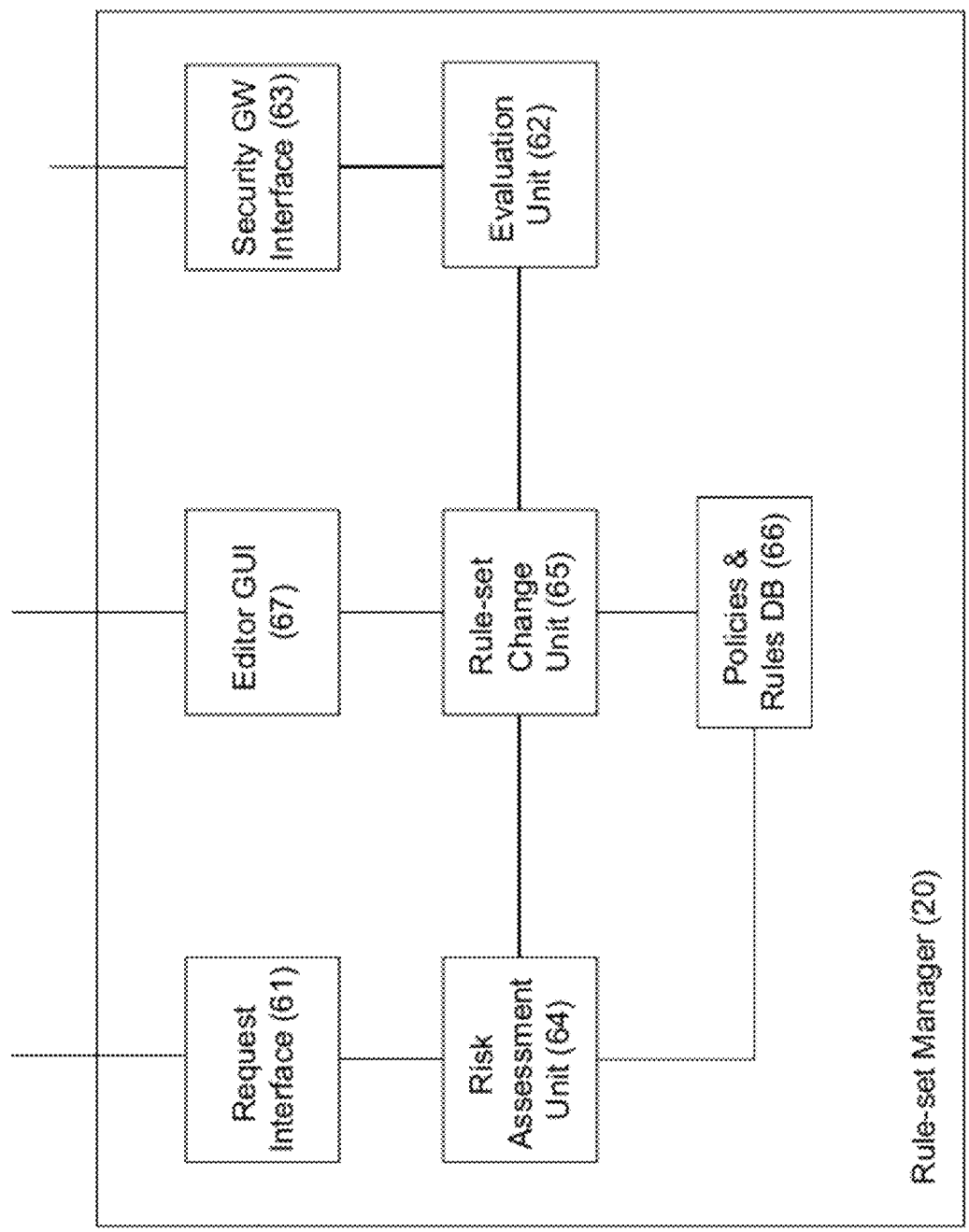
FIG. 6 illustrates a generalized functional diagram of a rule-set manager in accordance with certain embodiments of the present invention.

FIG. 6 illustrates a generalized functional diagram of the rule-set manager 20. The rule-set manager 20 comprises a request interface 61 configured to obtain data characterizing a connectivity request. Some of connectivity requests can become fully or partly satisfied only upon changes of the current rule-set. The connectivity requests can be received by the rule-set manager from a client (human user and/or application) for further analyses and/or respective rule-set amending. Optionally, a connectivity request can be received by the rule-set manager from a security gateway (or other network element) responsive to connectivity request(s) received by the security gateway from the client.

An evaluation unit 62 is operatively connected to the request interface 61. The evaluation unit 62 is configured to provided mapping between one or more connectivity requests and one or more security rules comprised in a certain rule-set implemented (or desired to be implemented) on certain security gateway(s). The evaluation unit 62 is further configured to provide evaluation and/or classification of the engaged rules and/or engaged connectivity requests as was detailed with reference to FIGS. 2-5. The evaluation unit 62 obtains data related to one or more rules from a policies and rules database 66 and/or from a security gateway interface 63, both operatively connected to the evaluation unit. The evaluation unit forwards the results of classification to a rule-set change unit 65 and/or to a risk assessment unit 64. Optionally, the evaluation unit can be further connected to GUI 67 enabling presenting the evaluation and/or classification results.

The rule-set change unit 65 is operable to process the obtained evaluation and/or classification data, to generate amendments to the current rule-set, and to provide the generated amendments to the respective security gateway (and/or security management block) via the security gateway interface 63 Likewise, the generated amendments can be provided to another device involved in policy management or to an administrator. The rule-set change unit can further operate in a manner detailed in U.S. patent application Ser. No. 12/781352 filed on May 17, 2010, assigned to the assignee of the present invention and incorporated herein by reference in its entirety.

The risk assessment unit 64 is operable to process the obtained evaluation and/or classification data, and to assess the risks related to the current rule-set and/or the risks related to amendment of the current rule-set if required in accordance with connectivity requests.

The rule-set manager can be further configured to provide functions disclosed in U.S. patent application Ser. No. 12/781,352 filed on May 17, 2010, and U.S. patent application Ser. No. 12/885,929 filed on Sep. 10, 2010. Both applications are assigned to the assignee of the present invention and are incorporated herein by reference in their entirety.

Those versed in the art will readily appreciate that the rule-set manager can be fully or partly integrated with the security gateway and/or the security management block and/or with other devices (e.g. communication devices, security devices, etc.), or can be implemented as a stand-alone entity, optionally connected to the security gateway.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based can readily be utilized as a basis for designing other structures, methods, and systems for carrying out the several purposes of the present invention.

It will also be understood that the system according to the invention can be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

Those skilled in the art will readily appreciate that various modifications and changes can be applied to the embodiments of the invention as hereinbefore described without departing from its scope, defined in and by the appended claims.

The invention claimed is:

1. A system capable of automatically mapping between a connectivity request and an ordered security rule-set, the system comprising:
    a memory;
    an interface operable to obtain data characterizing a first plurality of combinations of values specified in at least one connectivity request;
    a processor operatively coupled to the interface and the memory, the processor to:
    automatically recognize at least one rule within the rule-set, said rule controlling at least part of traffic requested in said at least one connectivity request, wherein the recognizing is provided by comparing the first plurality of combinations specified in the connectivity request with at least one second plurality of combinations, each of said at least one second plurality being firstly specified by a respective rule within the rule-set and matches connectivity-related actions specified in said at least one connectivity request;
    automatically evaluate a ratio between an un-shadowed volume requested by said at least one connectivity request in said recognized at least one rule and the overall un-shadowed volume of said recognized at least one rule, thereby giving rise to a conformity ratio characterizing the relationship between said at least one connectivity request and said recognized at least one rule, wherein the evaluation results indicate if said at least one connectivity request requires rule-set amendments in order to be accepted; and
    automatically classify said at least one connectivity request with respect to said at least one rule and/or said at least one rule with respect to said at least one connectivity request in accordance with said conformity ratio, wherein a classifying result is indicative of involvement of said recognized at least one rule in business needs associated with said at least one connectivity request.

2. The system of claim 1, wherein the connectivity-related actions are selected from a group comprising accepting, denying, authenticating and encrypting actions.

3. The system of claim 1 wherein the conformity ratio is calculated separately for fields of said recognized at least one rule.

4. A method of automatically managing an ordered security rule-set using a rule-set manager, the method comprising:
    obtaining data characterizing first pluralities of combinations of values specified, respectively, in one or more of connectivity requests;
    automatically recognizing by the rule-set manager at least one connectivity request requesting traffic at least partially controlled by a certain rule from the rule-set, thereby giving rise to at least one connectivity request engaged with respect to said certain rule, wherein the recognizing is provided by comparing a first plurality of combinations of values specified in said at least one connectivity request with a second plurality of combinations of values, said second plurality is firstly specified in said certain rule and matches connectivity-related actions specified in said certain connectivity request;
    automatically evaluating a ratio between an un-shadowed volume requested by said engaged connectivity request in said certain rule and the overall un-shadowed volume of said certain rule, thereby giving rise to a conformity ratio being indicative of a degree of satisfaction of said engaged connectivity request by said certain rule, wherein evaluating is provided by the rule-set manager and the evaluation results indicate if said at least one connectivity request requires rule-set amendments in order to be accepted; and
    in accordance with said conformity ratio, automatically classifying by the rule-set manager said certain rule with respect to said at least one engaged connectivity request, wherein a classifying result is indicative of involvement of said certain rule in business needs associated with said engaged connectivity request.

5. The method of claim 4, wherein the connectivity-related actions are selected from a group comprising accepting, denying, authenticating and encrypting actions.

6. The method of claim 4 wherein the conformity ratio is calculated separately for fields of said certain rule.

7. The method of claim 4 further comprising evaluating relationship between traffic controlled by the entire rule-set and traffic requested in all respectively engaged connectivity requests, wherein evaluating comprises calculating a ratio between an un-shadowed volume requested in the entire rule-set and the overall un-shadowed volume of the rule-set, thereby giving rise to a conformity ratio indicative of a degree of justification of the rule-set by business needs.

8. The method of claim 7 further comprising classifying the entire rule-set, wherein the entire rule-set is classified as requiring amendment if the calculated conformity ratio does not match a predefined criterion related to compliance of the rule-set.

9. The method of claim 4 wherein said engaged connectivity request requests allowance of respective traffic and said un-shadowed volume in said certain rule is un-shadowed allowable volume.

10. A method of automatically managing an ordered security rule-set using a rule-set manager, the method comprising:
    obtaining data characterizing a first plurality of combinations of values specified in a certain connectivity request;
    automatically recognizing by the rule-set manager at least one rule from the rule-set, said rule at least partially controlling traffic requested in said certain connectivity request, thereby giving rise to at least one rule engaged with respect to said certain connectivity request, wherein the recognizing is provided by comparing the first plurality of combinations of values specified in said certain connectivity request with at least one second plurality of combinations of values, each of at least one second plurality is firstly specified in respective rules from the rule-set and match connectivity-related actions specified in said certain connectivity request;
    automatically evaluating a ratio between an un-shadowed volume requested by said at least one connectively request in said at least one engaged rule and the overall un-shadowed volume of said at least one engaged rule, thereby giving rise to a conformity ratio characterizing a degree of satisfaction of said certain connectivity request by said at least one engaged rule, wherein the evaluating is provided by the rule-set manager and the evaluation results indicate if said at least one connectivity request requires rule-set amendments in order to be accepted; and
    in accordance with said conformity ratio, automatically classifying by the rule-set manager said certain connectivity request with respect to said at least one engaged rule, wherein a classifying result is indicative of involvement of said at least one engaged rule in business needs associated with said certain connectivity request.

11. The method of claim 10, wherein the connectivity-related actions are selected from a group comprising accepting, denying, authenticating and encrypting actions.

12. The method of claim 10 wherein the conformity ratio is calculated separately for fields of said certain rule.

13. The method of claim 10 further comprising evaluating relationship between traffic requested in all connectivity requests and traffic controlled by all respectively engaged rules in the rule-set, wherein evaluating comprises calculating a ratio between an un-shadowed volume requested in all engaged rules and the overall un-shadowed volume of all engaged rules.

14. The method of claim 10 further comprising:
    automatically recognizing at least two rules belonging to different rule-sets and engaged with respect to said certain connectivity request, wherein different rule-sets correspond to different revisions of a security policy;
    automatically evaluating relationship between the traffic requested in said certain connectivity request and traffic controlled by engaged rules corresponding to said different rule-sets;
    in accordance with the evaluation result, automatically classifying said different rule-sets and/or respective revisions of the security policy.

15. The method of claim 10 wherein said at least one connectively request requests allowance of respective traffic and un-shadowed volume in said at least one engaged rule is un-shadowed allowable volume.

16. A computer program product comprising a non-transitory computer useable medium having computer readable program code embodied therein for collecting information relating to a communication network and to nodes operating therein, the computer program product comprising:
    computer readable program code for enabling the computer to obtain data characterizing first pluralities of combinations of values specified, respectively, in one or more of connectivity requests;
    computer readable program code for enabling the computer to recognize at least one connectivity request requesting traffic at least partially controlled by a certain rule from the rule-set, thereby giving rise to at least one connectivity request engaged with respect to said certain rule, wherein the recognition is provided by comparing a first plurality of combinations of values specified in said one or more connectivity requests with a second plurality of combinations of values, said second plurality being firstly specified in said certain rule and matches connectivity-related actions specified in said certain connectivity request;
    computer readable program code for enabling the computer to evaluate a ratio between an un-shadowed volume requested by said engaged connectivity request in said certain rule and the overall un-shadowed volume of said certain rule, thereby giving rise to a conformity ratio being indicative of a degree of satisfaction of said engaged connectivity request by said certain rule, wherein the evaluation results indicate if said at least one connectivity request requires rule-set amendments in order to be accepted; and
    computer readable program code for enabling the computer, to classify said certain rule with respect to said at least one engaged connectivity request in accordance with said conformity ratio, wherein a classifying result is indicative of involvement of said certain rule in business needs associated with said at least one engaged connectivity request.

* * * * *